United States Patent
Rigollet et al.

(10) Patent No.: US 11,415,250 B2
(45) Date of Patent: Aug. 16, 2022

(54) DEVICE FOR COUPLING TWO TUBES WITH PRE-ASSEMBLY

(71) Applicant: CAILLAU, Issy-les-Moulineaux (FR)

(72) Inventors: Nicolas Rigollet, Romorantin (FR); Fabrice Prevot, Selles sur Cher (FR)

(73) Assignee: Caillau, Issy-les-Moulineaux (FR)

( * ) Notice: Subject to any disclaimer, the term of this patent is extended or adjusted under 35 U.S.C. 154(b) by 476 days.

(21) Appl. No.: 16/482,910

(22) PCT Filed: Feb. 6, 2018

(86) PCT No.: PCT/FR2018/050285
§ 371 (c)(1),
(2) Date: Aug. 1, 2019

(87) PCT Pub. No.: WO2018/146409
PCT Pub. Date: Aug. 16, 2018

(65) Prior Publication Data
US 2020/0011458 A1  Jan. 9, 2020

(30) Foreign Application Priority Data
Feb. 7, 2017 (FR) .................................. 1751002

(51) Int. Cl.
*F16L 21/00* (2006.01)
*F16L 21/06* (2006.01)
(52) U.S. Cl.
CPC ........... *F16L 21/005* (2013.01); *F16L 21/065* (2013.01)
(58) Field of Classification Search
CPC ....... F16L 21/002; F16L 21/005; F16L 21/06; F16L 21/065; F16L 21/08; F16L 37/00; F16L 37/084; F16L 37/0845; F16L 37/0985

USPC .......................... 285/337, 373, 419, 420, 307
See application file for complete search history.

(56) References Cited

U.S. PATENT DOCUMENTS

| 4,380,348 A | 4/1983 | Swartz | |
|---|---|---|---|
| 4,907,663 A | 3/1990 | Maier | |
| 8,316,881 B2 * | 11/2012 | Yamaguchi | B60K 15/04 137/515.5 |
| 9,121,535 B2 * | 9/2015 | Ammon | F16L 37/0987 |

(Continued)

FOREIGN PATENT DOCUMENTS

| CN | 101156015 A | 4/2008 |
|---|---|---|
| CN | 101734144 A | 6/2010 |

(Continued)

OTHER PUBLICATIONS

International Search Report for PCT/FR2018/050285, Authorized Officer M. Schlossarek, Date of Actual Completion Apr. 19, 2018, 4 pages.

(Continued)

*Primary Examiner* — Aaron M Dunwoody
(74) *Attorney, Agent, or Firm* — Fay Sharpe LLP

(57) ABSTRACT

The device includes a sealing sleeve suitable for being disposed around the facing ends of two tubes and a clamping sleeve inside which the sealing sleeve extends. One of the elements constituted by the sealing sleeve and by the clamping sleeve has at least one retaining member suitable for co-operating in axial retention inside the clamping sleeve with a retaining surface of one of the tubes, which retaining surface is covered by the clamping sleeve.

23 Claims, 6 Drawing Sheets

(56) References Cited

U.S. PATENT DOCUMENTS

| | | |
|---|---|---|
| 2005/0099001 A1 | 5/2005 | Cassel et al. |
| 2005/0189768 A1 | 9/2005 | Avram et al. |
| 2005/0264012 A1 | 12/2005 | Ignaczak et al. |
| 2011/0215574 A1 | 9/2011 | Prevot et al. |

FOREIGN PATENT DOCUMENTS

| | | |
|---|---|---|
| CN | 102089562 A | 6/2011 |
| JP | H07-190260 A | 7/1995 |
| JP | 2008-500503 A | 1/2008 |
| JP | 2008-190700 A | 8/2008 |
| RU | 2450198 C2 | 5/2012 |
| RU | 2014136721 A | 3/2016 |

OTHER PUBLICATIONS

Russian Search Report of Related RU2019127998 dated May 21, 2021, 2 pages.
Chinese Search Report of Related CN 201880010452.4 dated Dec. 3, 2020, 2 pages.

\* cited by examiner

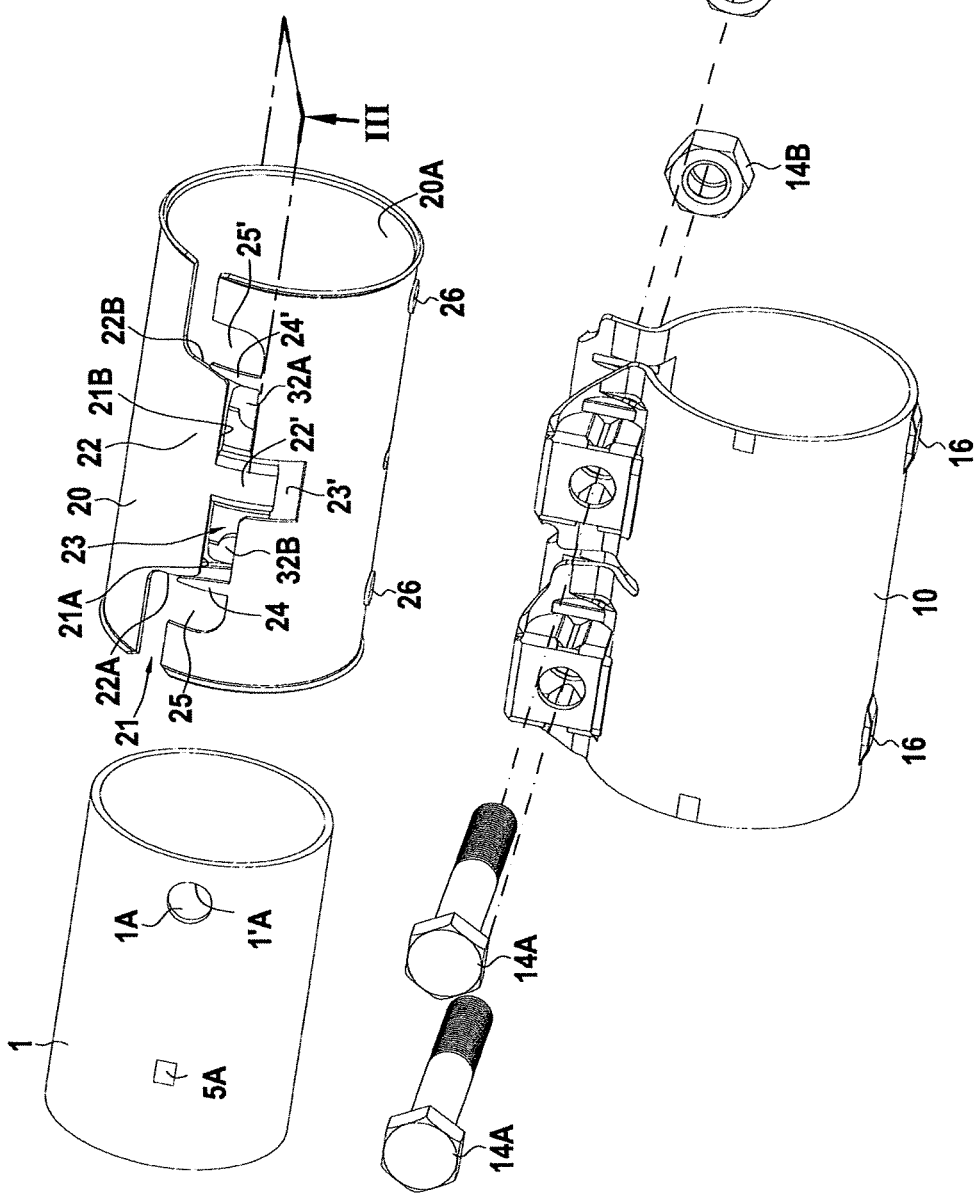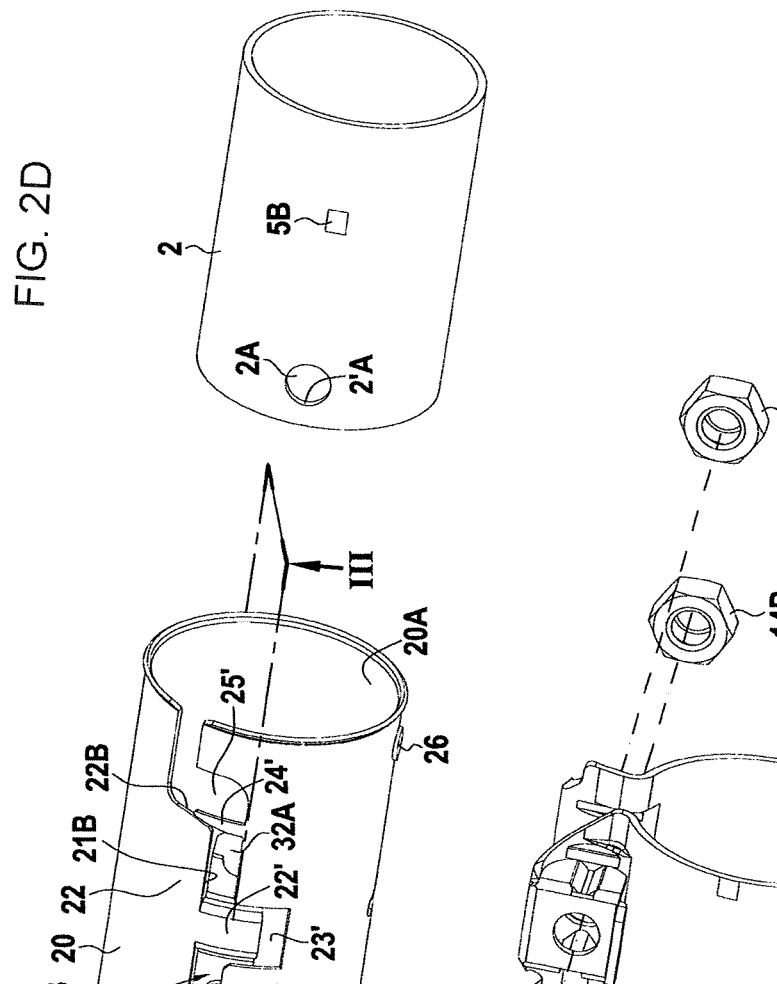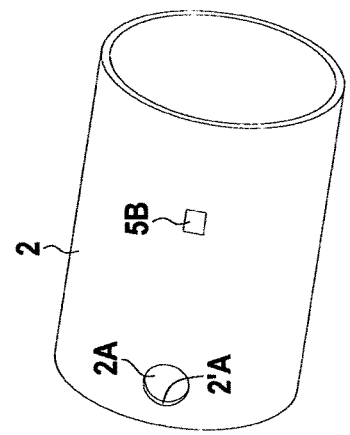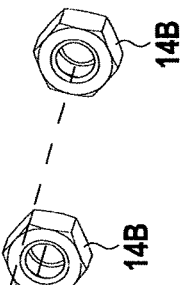

FIG. 7A
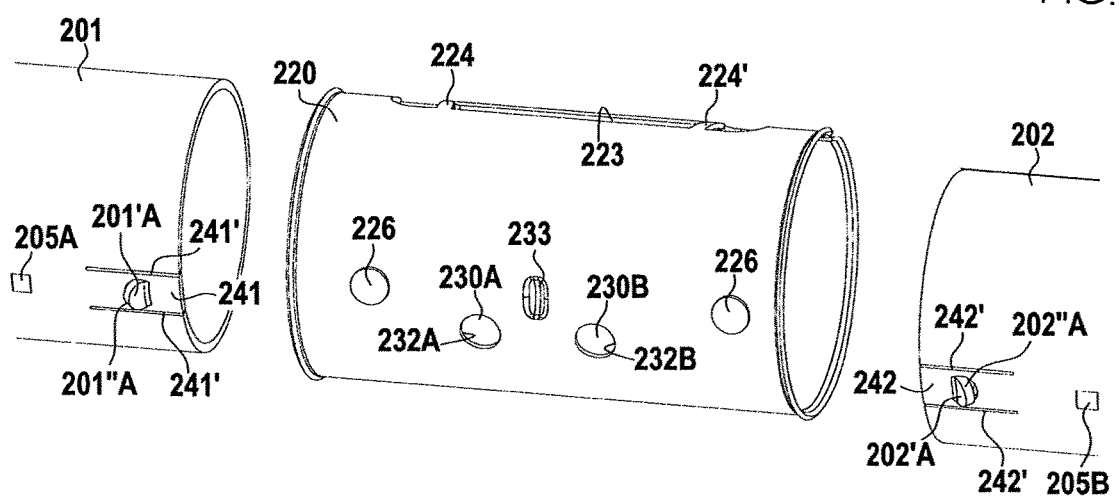
FIG. 7B
FIG. 7C
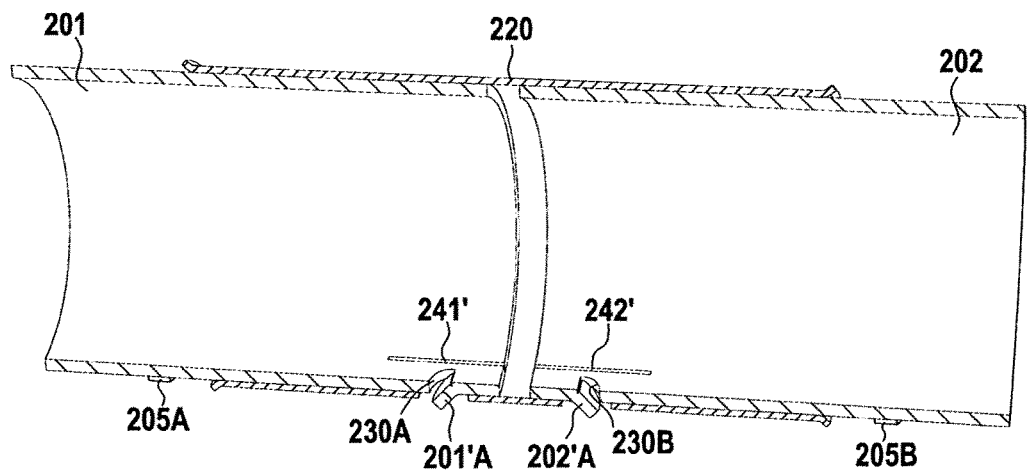
FIG. 8

DEVICE FOR COUPLING TWO TUBES WITH PRE-ASSEMBLY

CLAIM OF PRIORITY

This application claims priority from PCT Application No. PCT/FR2018/050285, filed on Feb. 6, 2018, which claims priority to French Patent Application No. FR 1751002, filed on Feb. 7, 2017, the entirety of which are hereby incorporated by reference.

BACKGROUND OF THE DISCLOSURE

The present specification relates to a coupling device for coupling together two aligned tubes of substantially the same diameter in sealed manner, the device comprising a sealing sleeve suitable for being disposed around the facing ends of the two tubes, and a clamping sleeve inside which the sealing sleeve extends.

A device of this type is known, for example, from Patent Applications WO 00/75548 and WO 2006/109002.

That known device is satisfactory as regards clamping and sealing. However, as regards practicality, it can be advantageous to be able to pre-attach the device to at least one of the tubes so as to facilitate assembly and so as to make sure the device is positioned correctly relative to the tube before starting to tighten it.

Document U.S. Pat. No. 7,458,619 proposes a solution making such pre-attachment possible, whereby one of the tubes has a projecting button, while the clamping sleeve caries a tab provided with a hole into which the button on the tube comes to be engaged before tightening is performed.

That system suffers from the drawback of requiring two external elements to be added, namely the button on the tube and the tab on the clamping sleeve. Firstly, it is necessary to fasten those elements correctly to the parts that carry them. Secondly, insofar as both of those elements are accessible from the outside, there is always a risk that they might become disunited from the parts that carry them because they are exposed directly to impacts. In particular, the tab provided with the hole might shift or become disunited from the clamping sleeve.

An object of the present specification is to provide a device that improves that state of the art and that overcomes the above-mentioned drawbacks in full or in part.

SUMMARY OF THE DISCLOSURE

Thus, the present specification provides a coupling device for coupling together two aligned tubes in sealed manner, the device comprising a sealing sleeve suitable for being disposed around the facing ends of the two tubes, and a clamping sleeve inside which the sealing sleeve extends, wherein one of the elements constituted by the sealing sleeve and by the clamping sleeve has at least one retaining member suitable for co-operating in axial retention inside the clamping sleeve with a retaining surface of one of the tubes, which retaining surface is covered by the clamping sleeve.

Thus, the pre-attachment is performed via the inside of the coupling device, by involving the retaining surface of the tube and the retaining member that equips the sealing sleeve or the clamping sleeve, said retaining surface and said retaining member being "protected" by the clamping sleeve that covers them in the pre-attachment situation.

Optionally, the retaining member has a cam surface suitable for co-operating with the retaining surface while the tube that has said retaining surface and said one of the elements that has the retaining member are being moved in rotation relative to each other, in a direction tending to disengage the axial retention.

By the coupling device and the tube that has the retaining surface being turned relative to each other, the co-operation between the retaining member and the retaining surface can be disengaged, thereby making it possible to separate the device and the tube, e.g. for detachment after the clamping sleeve has been loosened.

Optionally, the sealing sleeve has two sealing arrangements that are spaced apart axially, and the retaining member is disposed axially between the two sealing arrangements.

Optionally, the retaining member is carried by the sealing sleeve and is situated in a region of said sealing sleeve that is covered by the clamping sleeve; optionally the retaining member is formed integrally with said sealing sleeve.

Optionally, the retaining member is mounted inside the clamping sleeve and passes through a window in the sealing sleeve.

Optionally, the retaining member comprises a catch that extends inside said sealing sleeve. In which case, said catch optionally has a surface that is axially convex.

Optionally, the sealing sleeve has at least one internal tab that is offset radially inwards relative to a wall of the sealing sleeve, thereby defining radial spacing with said wall.

Optionally, the internal tab carries a retaining catch that projects outwards, said retaining catch optionally being cut out from the internal tab.

Optionally, the internal tab is cut out from a wall of the sealing sleeve and is folded back inwards.

Optionally, the device has at least one abutment surface for the end of one of the tubes.

Optionally, the abutment surface is formed at the base of the internal tab, which base is opposite from its free end.

Optionally, the device has an external marker indicating the position of the retaining member.

Optionally, said element that has the retaining member has two retaining members that are spaced apart axially.

Optionally, the sealing sleeve is of the open type and has two facing ends connected together via two sealing arrangements that are spaced apart axially.

Optionally, each of the two sealing arrangements has two contact surfaces, respectively situated on the edge of a tongue and on the edge of a notch.

The specification also provides a tube coupling assembly comprising a coupling device of the type described in the present specification and at least a first tube that is to be aligned with a second tube so as to be coupled to it via the coupling device, and wherein the first tube has a retaining surface suitable for co-operating with the retaining member inside the clamping sleeve.

Optionally, the retaining surface is formed on an edge of a setback formed set back from the inside surface of the first tube, or on an edge of a hole in the first tube.

Optionally, when the sealing sleeve has at least one internal tab that is offset radially inwards relative to a wall of the sealing sleeve, thereby defining radial spacing with said wall, the thickness of the first tube is received in said radial spacing.

Optionally, the retaining member is formed at the edge of a hole in the sealing sleeve, and the retaining surface is formed projecting relative to the outside surface of the first tube.

Optionally, said element that has the retaining member has two retaining members that are spaced apart axially, and each of the first and second tubes has a retaining surface suitable for co-operating with a respective one of the retaining members.

Optionally, at least one of the first and second tubes has an external marker indicating the position of the retaining surface.

With the device of the present specification, pre-attachment to at least one of the tubes is easy, and the means involved are protected by the clamping sleeve. In addition, in certain aspects, the retaining member and/or the retaining surface may be formed integrally with the elements that carry them (i.e. the sealing sleeve or the clamping sleeve, or indeed the tube), so that there is no risk of them becoming disunited. In any event, even if the retaining member and/or the retaining surface are formed on separately mounted elements, the fact they are protected on the outside by the clamping sleeve avoids risks of them being broken or damaged.

The device implementing the co-operation between the retaining member and the retaining surface can serve not only to achieve axial retention of the device relative to at least one of the tubes, making pre-attachment possible, but also to cause the tube in question and the device to be held stationary relative to each other while being sure they are in the correct position relative to each other.

If it is desired to be able to perform detachment without requiring any tools, it is possible, as mentioned above, to make provision for the retaining member to have a cam surface enabling pre-attachment to be achieved after the device and the tube equipped with the retaining surface have been moved angularly relative to each other. This cam surface may be in the form of a catch having an axially convex surface.

In certain aspects, the retaining member may be implemented by simple folding and cutting-out operations that can be performed very quickly, using simple tools and therefore at very low cost.

In certain aspects, the device has two retaining members that are spaced apart axially. This can, firstly, make reversibility possible, by enabling the device to be placed in one direction or the other with the tube equipped with the retaining surface, so as to cause either one of the two retaining members to co-operate with said surface. This option can be advantageous for positioning the means for tightening the clamping sleeve in such a manner that they are more easily accessible, as a function of the environment of the device mounted on the tubes. In addition, this can make it possible to pre-attach the device to both of the tubes by causing each of the two retaining members to co-operate with two retaining surfaces respectively carried by each of the two tubes.

BRIEF DESCRIPTION OF THE DRAWINGS

The present specification will be better understood on reading the following detailed description of embodiments of the coupling device that are shown by the accompanying figures, in which:

FIG. 2A is an exploded perspective view of the clamping sleeve and bolts and nuts of the assembly of FIG. 1;

FIG. 2B is a perspective view of a tube of the assembly of FIG. 1;

FIG. 2C is a perspective view of a sealing sleeve of the assembly of FIG. 1;

FIG. 2D is a perspective view of a tube of the assembly of FIG. 1;

FIG. 7A is a partial perspective view of a tube of a second embodiment;

FIG. 7B is a perspective view of a sealing sleeve in accordance with a second embodiment;

FIG. 7C is a partial perspective view of a tube in accordance with a second embodiment;

FIG. 8 is a partial perspective view of the tubes as assembled together with the sealing sleeve, in section on a plane containing the axis of said sleeve;

DETAILED DESCRIPTION OF THE DISCLOSURE

Figure 1:
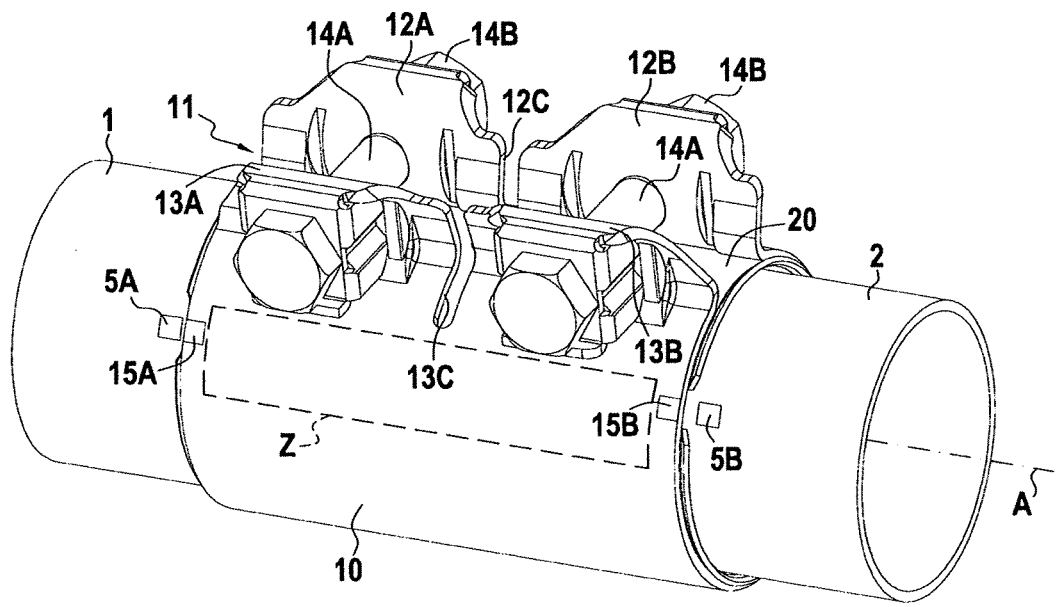
FIG. 1 is a perspective view of a tube coupling assembly of the present specification coupling together two tubes, which assembly includes a coupling device serving to couple together the two tubes.

FIG. 1 shows the ends of two tubes 1 and 2 that are aligned along their common axis A, which is also the general axis of the device and, in particular, of its clamping and sealing sleeves. The two tubes are of substantially the same diameter and are coupled together by means of a coupling device that comprises a clamping sleeve 10, and a sealing sleeve 20 that is situated inside the clamping sleeve 10. As described, for example, by Application WO 00/75548, the sealing sleeve is split axially and thus has an axial slot 11 defined by assembly lips that are turned out radially. In order to achieve the clamping, the mutually facing assembly lips can be brought closer together by tightening means, in particular by a bolt co-operating with a nut. In this example, given the axial length of the sleeve, two tightening assemblies are provided. Thus, the first assembly lip comprises two turned-out lugs 12A and 12B, separated by a slot 12C that dissociates them from each other while they are being brought closer together under the effect of the tightening, while the opposite lip is also provided with two turned-out lugs, respectively 13A and 13B, that are separated by a slot 13C. For each pair of facing lugs, the tightening means comprise a bolt 14A having its head retained relative to one of the lugs, and a nut 14B that is retained relative to the other lug.

Thus, the clamping sleeve is substantially analogous to the clamping sleeve disclosed by Document WO 2006/109002.

As mentioned above, the sealing sleeve is disposed inside the clamping sleeve.

The sealing sleeve may also be similar to the one disclosed in Document WO 2006/109002, in that it is implemented in the form of a sleeve that is open axially along an axial slot 21, its facing edges that define said slot being provided with sealing arrangements. For example, the sealing arrangements may be implemented like those disclosed by Document WO 00/75548 or like those disclosed by Document WO 2006/109002. In this example, the facing edges of the sealing sleeve 20 are provided respectively with a tongue 22 and with a notch 23 that is defined between two tabs, respectively 24 and 24'. It can be understood that, during tightening of the clamping sleeve, the diameter of the sealing sleeve decreases, thereby causing the tongue 22 to advance into the notch 23, sealed contact then taking place between contact surfaces formed on the side edges 22A and 22B of the tongue 22 and respective ones of contact surfaces formed on the respective ones of the tabs 24 and 24'. Thus, two sealing arrangements are implemented, which arrangements are spaced apart axially and comprise respectively the surfaces in contact of the tab 24 and of the edge 22A of the tongue and the surfaces in contact of the tab 24' and of the edge 22B of the tongue. In the example shown, clearance-forming recesses 25 and 25' are respectively formed on those sides of the tabs 24 and 24' that face away from the tongue, so as to facilitate folding of the tabs and so as to facilitate sealed contact, as described in Document WO 2006/109002.

When it is disposed inside the clamping sleeve 10, the sealing sleeve 20 is held stationary radially and axially relative to said clamping sleeve. In this example, the sealing sleeve is provided with two projections 26 situated on its outside periphery and that come to engage in dishes formed on the insides of bosses 16 with which the clamping sleeve 10 is provided.

The coupling device is equipped with pre-attachment means for pre-attaching it to the tubes 1 and 2. In this example, each of said tubes is provided with a hole, respectively 1A and 2A, close to its end that faces towards the other tube. In this example, these holes are circular holes, and the front edges, respectively 1'A and 2'A, of the holes form retaining surfaces. In the meaning of the present specification, the front edge is the one that is closer to the end of the tube that faces towards the other tube.

The sealing sleeve is provided with two retaining members for co-operating with respective ones of the retaining edges 1'A and 2'A of the tubes 1 and 2. More precisely, as can be seen more clearly in FIGS. 2A-2D to 4, the sealing sleeve 20 is provided with two internal tabs, respectively 30A and 30B, each of which is provided with a respective retaining catch, 32A or 32B, that projects outwards.

Figure 4:
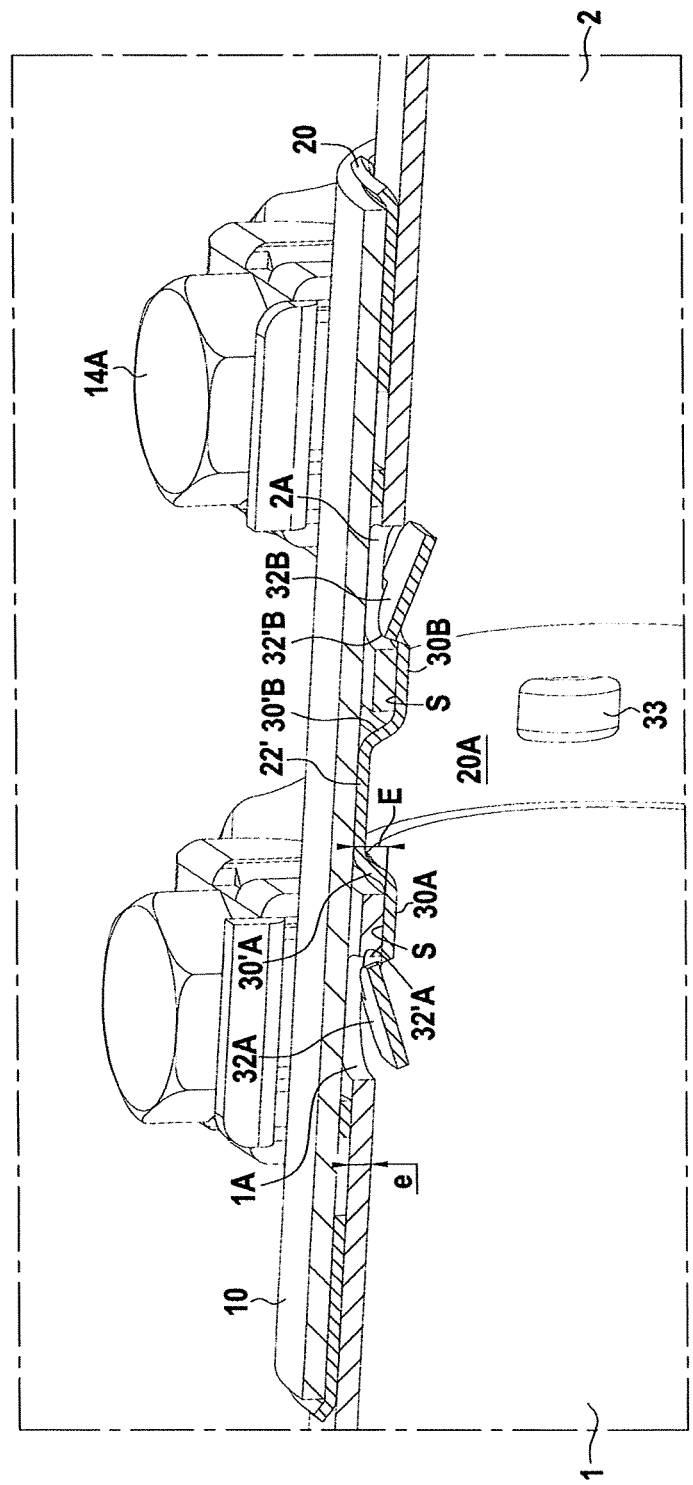
FIG. 4 is a partial perspective view of the coupling device for assembling together two tubes, also in section on a plane containing the axial direction of the sealing sleeve, and showing the insides of the tubes co-operating with said sleeve.

In this example, it can be seen, in particular in FIG. 4, that the internal tabs are offset radially inwards relative to the inside peripheral wall 20A of the sealing sleeve. Said inside peripheral wall defines a cylindrical surface adapted to fit the outside cylindrical surfaces of the tubes, which tubes come to be engaged into the sealing sleeve in interfitting manner therewith. As can be seen in FIG. 4, radial spacing E is defined between the inside peripheral wall of the sleeve and the outside peripheral surfaces S of the internal catches 30A and 30B. This radial space E is adapted to match the thickness e of the tubes. It can be seen in FIG. 4 that the tubes 1 and 2 come to be inserted under the tabs 30A and 30B, i.e. between respective ones of the tabs 30A and 30B and the inside wall 20A of the sealing sleeve 20.

However, the catches 32A and 32B project outwards relative to the outside peripheral surfaces S of the tabs. As can be seen in FIG. 4, when the tubes are engaged in the pre-attached position, the catches 32A and 32B project respectively into the holes 1A and 1B in the tubes 1 and 2. The catches 32A and 32B are formed by tongues that are cut out from the respective ones of the tabs 30A and 30B, and that are folded to a small extent so that their free ends project radially outwards relative to the outside peripheral surfaces S of the tabs 30A and 30B.

Figure 3:
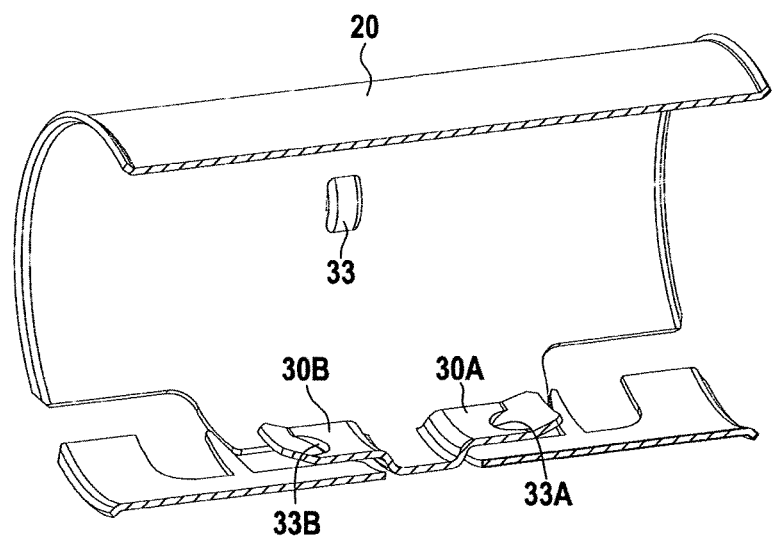
FIG. 3 is a perspective view of the sealing sleeve, in section on a plane III containing the axis of the sleeve and a diameter of said sleeve, showing the inside of the sealing sleeve.

It can be seen, in particular in FIG. 3, that the cutouts, respectively 33A and 33B, that thus serve to form the catches 32A and 32B are of semicircular shape. Thus, the catches 32A and 32B have axially convex surfaces. This means that, in projection on a plane containing the axial direction A and a direction perpendicular to the axis A and passing through the catch, said catch defines a convex shape. In this example, as mentioned above, the cutouts are of semicircular shape. Naturally, other shapes would be appropriate, in particular elliptical, parabolic, or like shapes. The retaining surfaces 1'A and 2'A are surfaces that are axially concave. In this example, as mentioned above, said retaining surfaces are formed by the front edge edges of the holes 1A and 2A in the tubes, which holes are circular or elliptical. As a result, the co-operation between the retaining surfaces and the retaining members formed by the catches is similar to cam co-operation. The axially convex surfaces of the catches forming the retaining members form cam surfaces that, while the tubes and the sealing sleeve 20 are being moved in rotation relative to each other about the axis A, resiliently urge the catches towards the axis A while enabling the retaining surfaces 1'A and 2'A formed by the edges of the holes 1A and 1B to escape from said catches, in such a manner as to enable the tubes to be disengaged from the sealing sleeve.

Insofar as the sealing sleeve is, as mentioned above, held stationary radially relative to the clamping sleeve, in this example by means of the catches 26 entering into the dishes formed on the insides of the bosses 16, it can be understood that it is possible to detach the device by holding the clamping sleeve and by turning each of the tubes relative to said clamping sleeve.

In this example, the internal tabs 30A and 30B are formed in the vicinity of the free end of the tongue 22 that defines the axial slot 21 in the sealing sleeve 20. More precisely, it can be seen in FIG. 2 that said tongue has an extension 22' that extends in the circumferential direction while remaining at the nominal diameter of the sealing sleeve. The nominal diameter is the diameter of the cylinder substantially formed by the sleeve. It can be seen in FIG. 2 that the end wall of the notch 23 that is defined between the sealing tabs 24 and 24' has a setback 23' adapted to receive the extension 22' of the tongue 22.

On either side of said extension 22', cutouts 21A and 21B are formed that extend parallel to the axis A of the sleeve. Said cutouts define the free edge of the tongue 22 and the internal tabs 30A and 30B. Thus, said internal tabs extend beyond the tongue, on the other side of the cutouts 21A and 21B. Each internal tab extends substantially axially. The internal tabs are folded back inwards and it can be seen in FIG. 4 that where they are connected to the extension 22', respective inward steps 30'A and 30'B are formed, the steps corresponding to the above-mentioned radial spacing E.

In other words, the internal tabs 30A and 30B are cut out in the wall of the sealing sleeve, and are folded back inwardly. The catches 32A and 32B are themselves cut out and folded back from said internal tabs. Thus, in this example, the retaining members (in this example: the catches 32A and 32B) are formed integrally with the sealing sleeve.

The above-mentioned steps 30'A and 30'B form abutment surfaces for the ends of the tubes 1 and 2 when said tubes are engaged into the sealing sleeve 20 in interfitting manner therewith. Thus, in this example, the abutment surfaces are formed at the bases of the internal tabs 30A and 30B, which bases are opposite from their free ends. It should also be noted that the inside wall of the sealing sleeve has a boss 33 situated substantially in its middle. In its widthwise direction, the boss 33 can also serve as an abutment surface for the tubes 1 and 2.

In the above-described example, the sealing sleeve 20 is provided with two retaining members, each one for co-operating with a respective one of the tubes 1 and 2. This makes it possible to pre-attach the device to the two tubes before clamping the two tubes and connecting them together in sealed manner. Naturally, it is possible to make provision for the device to have only one retaining member, e.g. a retaining member analogous to one of the above-described retaining members, so as to pre-attach the device to one of the tubes only.

As mentioned above, the interconnection must be sealed, i.e. leaktight. Thus, as described in Document WO 2006/109002, the slot 21 in the sealing sleeve, which slot is equipped with the above-described sealing arrangements, is situated in an uninterrupted region of the sealing sleeve that is remote from the clamping slot 11 in the clamping sleeve. Said slot 21 is thus covered by the clamping sleeve 10 and is, for example, situated in the region Z indicated in FIG. 1. Thus, the entire portion of the notch 23 that is situated between the tabs 24 and 24' of the sealing arrangements is covered by the clamping sleeve 10 and, since the two sleeves are pressed together, sealing is secured. The retaining members are disposed axially between the two sealing arrangements formed by the surfaces in contact between the edge 22A of the tongue 20 and the tab 24, and between the edge 22B of the tongue 20 and the tab 24'. Thus, the holes 1A and 2A in the tubes 1 and 2 are also situated between the two sealing arrangements and any leaks between the tubes are thus trapped in the axial segment defined by respective ones of said arrangements. Therefore, the pre-attachment of the present specification has no negative impact on the sealing of the interconnection of the two tubes.

Figure 5:
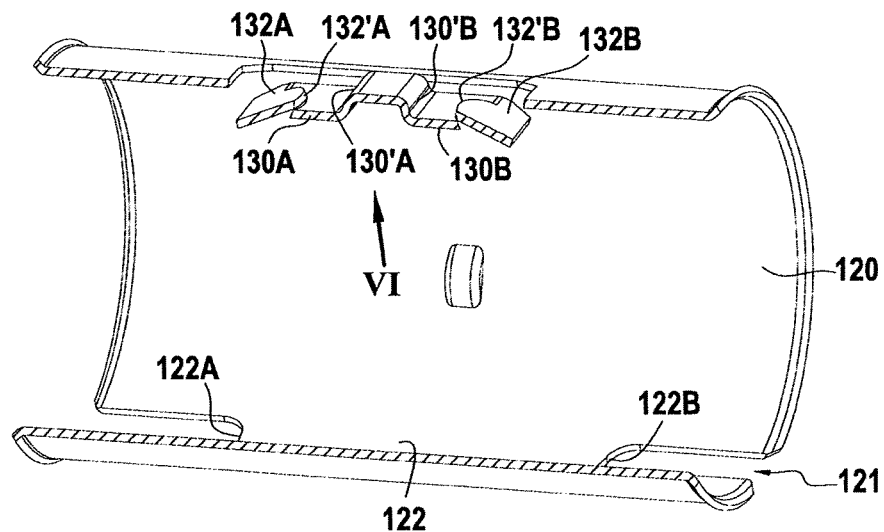
FIG. 5 shows a perspective view of variant for the sealing sleeve, also in perspective, in section on a plane containing the axial direction of the sleeve.
Figure 6:
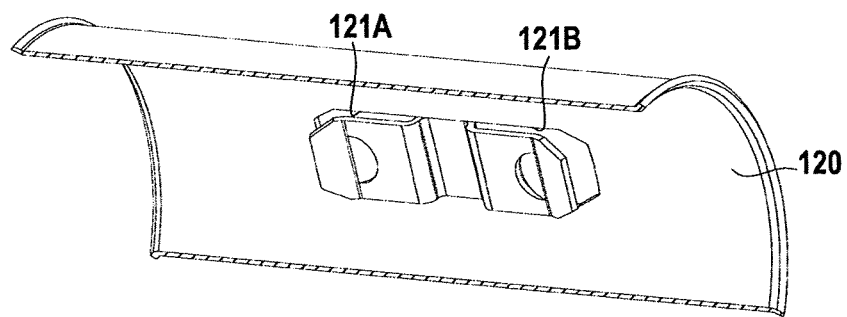
FIG. 6 is a partial perspective view of the inside of the sealing sleeve in the direction VI of FIG. 5.

There follows a description of FIGS. 5 and 6 that show a variant embodiment. This variant differs from the variant shown in FIGS. 1 to 4 only by the shaping of the sealing sleeve, which, in this example, is referenced 120. For this sealing sleeve 120, the sealing arrangements are analogous to those described above. However, in this variant, the retaining members are disposed in a region of the sealing sleeve that is remote from the slot 121 in said sleeve. FIG. 5 shows the sealing tongue 122 that defines one of the edges of said slot. The retaining members are formed by catches 132A and 132B, themselves formed in internal tabs 130A and 130B, which catches also have axially convex surfaces, formed by their free edges 132'A and 132'B corresponding to the shape, e.g. semicircular, of the cutouts that were made specifically to form said catches, which, as in the above embodiment, are in the form of cut-out and raised tongues. The internal tabs 130A and 130B are formed by cutouts 121A and 121B in the sealing sleeve 120 and are folded back inwardly. Thus, these internal tabs are almost identical to those of the variant shown in FIGS. 1 to 4, except that they are formed in a portion of the wall of the sleeve 120 that is remote from its axial slot 121. FIG. 5 also shows the steps 130'A and 130'B formed at the bases of said internal tabs, for forming abutment surfaces for the tubes. The catches 132A and 132B are disposed axially between the side edges 122A and 122B of the sealing tongue 122, so that, as in the variant shown in FIGS. 1 to 4, the retaining members are disposed axially between the sealing arrangements that thus trap any leaks in the space that they define axially.

In the above-described variants, the retaining surface is formed on the edge of a hole 1A or 2A in the tube 1 or 2. It could also be formed on the edge of a setback that is set back from the inside surface of the tube and into which the retaining catch would come to be engaged.

There follows a description given with reference to FIGS. 7A-7C and 8 of a variant in which it is the retaining member that is formed at the edge of a hole affecting sealing. In FIGS. 7A-7C, the two tubes 201 and 202 are shown before they are engaged into the sealing sleeve 220 in interfitting manner therewith. The clamping sleeve is not shown, but it may be identical to the above-described clamping sleeve 10. It can be understood that the sealing sleeve 220 is provided with a slot 221 having sealing arrangements analogous to those described above, and, in particular, the tabs 224 and 224' can be seen that define the edges of the notch 223. The sealing sleeve 220 also has bosses 226 on its outside surface, which bosses are analogous to the bosses 26 described with reference to FIG. 2 so as to enable said sleeve to be held stationary axially and in rotation inside the clamping sleeve. It can also be seen that the sealing sleeve 220 is provided with two holes, respectively 230A and 230B that, in this example, are circular holes. As regards the tubes 201 and 202, they are provided with catches 201'A and 202'A, which, in the pre-attached state shown in FIG. 8, come to be engaged in the holes 230A and 230B in the sealing sleeve. The catches 201'A and 202'A project radially outwards. In this example, they are implemented in the form of tongues cut out from the tubes and thus having edges, respectively 201"A and 202"A, that are axially convex and that co-operate with the rounded edges of the holes 230A and 230B. Thus, as in the above-described variants, a relative movement in rotation of the tubes and of the sealing sleeve can make it possible to cause the axial retention co-operation between the retaining members and the retaining surfaces to cease. In this example, the catches 201'A and 202'A are formed in portions of the tubes, which portions are referenced respectively 241 and 242, and are defined between axial slots, respectively 241' and 242'. These axial slots open out in the mutually facing free ends of the tubes. Each catch is, as it were, formed in a respective one of the axial tabs 241 and 242 defined by said axial slots, it thus being possible for said axial tab to be elastically deformable radially to a certain extent. On engaging the tubes into the sealing sleeve 220 in interfitting manner therewith, this enables the axial tabs to be retracted inwards so as to enable the catches 201'A and 202'A to advance into the sealing sleeve 220, until said catches snap-fasten into the openings 230A and 230B under the effect of the elastic deformability of the above-mentioned axial tabs 241 and 242. In this example, the retaining members are formed by the rear edges, respectively 232A and 232B, of the holes 230A and 230B. The inside face of the boss 233 of the sealing sleeve may serve as an abutment for the tubes.

With reference to FIGS. 9A-9D, there follows a description of another variant in which the retaining members are carried by the clamping sleeve 310. FIGS. 9A-9D show the clamping sleeve 310, the sealing sleeve 320 and the tubes 301 and 302 in a fragmentary view in section on an axial plane passing through the axial slot 311 of the clamping sleeve, of which the tightening lugs 314A and 314B can be seen; conversely, the axial slot and the sealing arrangements of the sealing sleeve 320 are not shown in FIGS. 9A-9D. The tubes may be identical to those shown in FIGS. 1 to 4, and, like them, they are provided with holes, respectively 301A and 302A, the front edges 301'A and 302'A of which form retaining surfaces. The retaining members are similar to those of the variants shown in FIGS. 1 to 6, and are thus implemented in the form of catches, respectively 332A and 332B formed by tongues cut out from internal tabs, respectively 330A and 330B. However, said internal tabs are formed in a retaining element 329 that is fastened to the inside periphery of the clamping sleeve 310. This element 329 has a base 329A pressed against the inside surface of the clamping sleeve and fastened to said surface, e.g. by welding or by any other suitable means, the internal tabs being folded inwards relative to said base 329A.

The sealing sleeve has a window 327 through which the internal tabs 330A and 330B pass when the sealing sleeve is disposed inside the clamping sleeve. The distance D between the outside faces of the internal tabs and the inside periphery of the clamping sleeve 310 is substantially equal to the sum of the radial spacing E mentioned above with reference to FIG. 4 and of the thickness of the sealing sleeve 320. Thus, once the internal tabs are disposed in the window 327, they project into the sealing sleeve in the same way as the internal tabs 30A and 30B or 130A and 130B of the variants shown in FIGS. 1 to 4, and 5 and 6. The tubes are put in place for the pre-attachment in the same way as in those variants, it being possible for the tubes to be inserted axially into the assembly of the two sleeves as assembled together one inside the other, that insertion causing the catches 332A and 332B to retract until they find themselves in the holes 301A and 302A. The internal tabs 330A and 330B are interconnected at their bases 329A via folds forming substantially radial walls 330'A and 330'B that can serve as abutment surfaces for the ends of the tubes.

Naturally, all of the means that serve to retain the tubes, namely the retaining members, the window 327 and the holes 301A and 302A are situated in a region of the clamping sleeve 310 that is closed by the wall of said sleeve, thereby securing sealing in said region. In addition, and as in the preceding figures, the axial slot in the sealing sleeve that is provided with the sealing means is also situated in a region of the clamping sleeve that is closed by its wall. Apart from the window 327, the sealing sleeve 320 may be analogous to the sealing sleeve disclosed by Document WO 2006/109002.

In the same way as in the variants shown in the preceding figures, although two retaining members 332A and 332B serving to retain both of the tubes are described, it is possible to make provision for only one of the tubes to have a retaining surface that can co-operate, depending on which attachment direction is chosen, with one or the other of said two retaining members, or else it is possible to make provision for the clamping sleeve to have only one retaining member, e.g. of the type described with reference to FIG. 9.

It should be noted that retaining catches 332A and 332B are formed from rounded cutouts, and therefore have cam surfaces that can co-operate with retaining surfaces so as to enable detachment to take place by the clamping sleeve and the tubes being moved in rotation relative to each other.

In any one of the above-described variants, it is possible to make provision for the coupling device to have an eternal marker indicating the position of the retaining member.

Thus, it can be seen in FIG. 1 that the clamping sleeve 10 has two markers 15A and 15B at its axial ends. The markers are axially aligned with the positions of the retaining members 32A and 32B, it being recalled that this position is determined once the sealing sleeve is inside the clamping sleeve, the sealing sleeve being held stationary in rotation inside the clamping sleeve 10 as described above. This makes it possible, while the tubes are being engaged into the devices in interfitting manner therewith, to align the holes 1A and 2A with the respective ones of the markers 15A and 15B so that the retaining surfaces are angularly positioned correctly relative to the retaining members and so as to ensure these elements co-operate properly with each other.

The markers may be implemented in any suitable form, e.g. notches, bosses, lines in color, etc.

Markers of the same type may be provided in the variant of FIGS. 7 and 8, by being aligned axially with the holes 230A and 230B in the sealing sleeve.

Figure 9A:
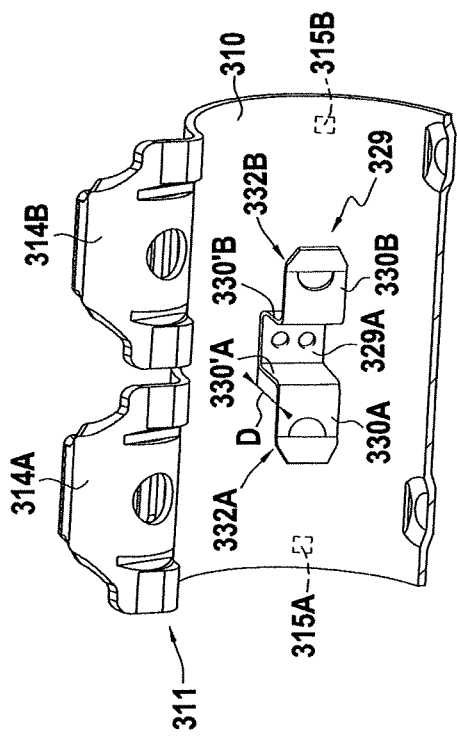
FIG. 9A is a perspective view, in section on a plane containing the axis of the device of a clamping sleeve in accordance with another embodiment.
Figure 9D:
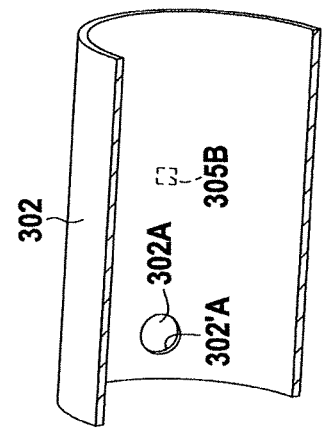
FIG. 9D is a perspective view in section of a plane containing the axis of the device of a tube in accordance with another embodiment.
Figure 9C:
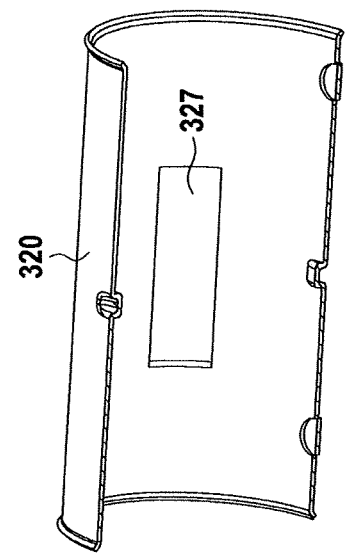
FIG. 9C is a perspective view in section of a plane containing the axis of the device of a sealing sleeve in accordance with another embodiment.
Figure 9B:
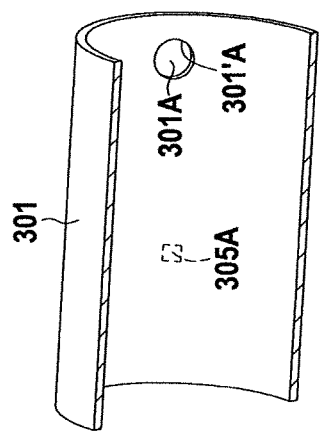
FIG. 9B is a perspective view in section of a plane containing the axis of the service of a tube in accordance with another embodiment.

FIGS. 9A-9C also show the positions of such markers 315A and 315B, aligned with the catches 332A and 332B.

In addition, it is possible to make provision for the tubes also to have external markers indicating the positions of the retaining surfaces. Thus, FIGS. 1 and 2 show such markers, respectively 5A for tube 1 and 5B for tube 2. These markers are formed remote from the ends of the tubes in such a manner as to remain visible when the tubes are engaged in the coupling device in interfitting manner therewith. When the markers 5A and 5B are aligned with the markers 15A and 15B, the fitter knows that the tubes are positioned correctly in the device. The markers 5A and 5B may be implemented in any suitable manner, e.g. by bosses, by setbacks, or indeed by markings in color. Such markers, respectively 205A & 205B, and 305A & 305B, are also shown in FIGS. 7 and 9.

In the various variants described above, the retaining members and the retaining surfaces co-operate by resilient snap-fastening or clipping. More precisely, in the variants shown in FIGS. 1 to 6 and 9, the retaining members carried by the sealing sleeve or by the clamping sleeve retract resiliently to enable the tubes (or at least one tube) to be inserted into the coupling device, and take up their free shapes again so as to be retained against the retaining surfaces. In a variant shown in FIGS. 7 and 8, it is the retaining surfaces carried by the tubes that retract resiliently while the tubes (or one tube) is/are being inserted into the coupling device so as then to return and catch in the holes that form the retaining members.

The invention claimed is:

1. A coupling device for coupling together two axially aligned tubes in sealed manner, the device comprising a sealing sleeve suitable for being disposed around facing ends of the two tubes, and a clamping sleeve inside which the sealing sleeve extends, one of the sealing sleeve and the clamping sleeve having at least one retaining member suitable for co-operating in axial retention inside the clamping sleeve with a retaining surface of one of the tubes, which retaining surface is covered by the clamping sleeve, the sealing sleeve has at least one internal tab that is offset radially inwards relative to a wall of the sealing sleeve, thereby defining radial spacing with said wall.

2. The device according to claim 1, wherein the retaining member has a cam surface suitable for co-operating with the retaining surface while the tube that has said retaining surface and said one of the sealing sleeve and the clamping sleeve that has the retaining member are being moved in rotation relative to each other, in a direction tending to disengage the axial retention.

3. The device according to claim 1, wherein the sealing sleeve has two sealing arrangements that are spaced apart axially, and the retaining member is disposed axially between the two sealing arrangements.

4. The device according to claim 1, wherein the retaining member is carried by the sealing sleeve and is situated in a region of said sealing sleeve that is covered by the clamping sleeve.

5. The device according to claim 4, wherein the retaining member is formed integrally with the sealing sleeve.

6. The device according to claim 1, wherein the retaining member is mounted inside the clamping sleeve and passes through a window in the sealing sleeve.

7. The device according to claim 1, the retaining member comprises a catch that extends inside said sealing sleeve.

8. The device according to claim 7, wherein the catch has a surface that is axially convex.

9. The device according to claim 1, wherein the internal tab carries a retaining catch that projects outwards.

10. The device according to claim 9, wherein the retaining catch is cut out from the internal tab.

11. The device according to claim 1, wherein the internal tab is cut out from a wall of the sealing sleeve and is folded back inwards.

12. The device according to claim 1, having at least one abutment surface for the end of one of the tubes.

13. The device according to claim 1, having at least one abutment surface for the end of one of the tubes, the abutment surface being formed at a base of the internal tab, which base is opposite from a free end of the internal tab.

14. The device according to claim 1, having an external marker indicating a position of the retaining member.

15. The device according to claim 1, wherein said one of the sealing sleeve and the clamping sleeve that has the retaining member has two retaining members that are spaced apart axially.

16. The device according to claim 1, wherein the sealing sleeve is of the open type and has two facing ends connected together via two sealing arrangements that are spaced apart axially.

17. The device according to claim 16, wherein each of the two sealing arrangements has two contact surfaces, respectively situated on an edge of a tongue and on an edge of a notch.

18. A tube coupling assembly comprising at least a first tube, a coupling device for coupling together the first tube with a second tube in aligned and sealed manner, the coupling device comprising a sealing sleeve suitable for being disposed around the facing ends of the two tubes, and a clamping sleeve inside which the sealing sleeve extends, one of the sealing sleeve and the clamping sleeve having at least one retaining member suitable for co-operating in axial retention inside the clamping sleeve with a retaining surface of the first tube, which retaining surface is covered by the clamping sleeve, wherein the sealing sleeve has at least one internal tab that is offset radially inwards relative to a wall of the sealing sleeve, thereby defining radial spacing with said wall, a portion of the first tube being received in said radial spacing.

19. The assembly according to claim 18, wherein the retaining surface is formed on an edge of a setback formed set back from the inside surface of the first tube, or on an edge of a hole in the first tube.

20. The assembly according to claim 18, wherein the retaining member is formed at an edge of a hole in the sealing sleeve and the retaining surface projects relative to the outside surface of the first tube.

21. The assembly according to claim 18, wherein said one of the sealing sleeve and the clamping sleeve that has the retaining member has two retaining members that are spaced apart axially, and said assembly further comprises the second tube, and wherein each of the first and second tubes has a retaining surface suitable for co-operating with a respective one of the retaining members.

22. The assembly according claim 18, wherein at least one of the first and second tubes has an external marker indicating a position of the retaining surface.

23. A coupling device for coupling together two axially aligned tubes in sealed manner, the device comprising a sealing sleeve suitable for being disposed around facing ends of the two tubes, and a clamping sleeve inside which the sealing sleeve extends, one of the sealing sleeve and the clamping sleeve having at least one retaining member suitable for co-operating in axial retention inside the clamping sleeve with a retaining surface of one of the tubes, which retaining surface is covered by the clamping sleeve, wherein the sealing sleeve is axially open along an axial slot, the axial slot having two facing ends connected together via two sealing arrangements that are spaced apart axially.

* * * * *